(12) United States Patent
Redick et al.

(10) Patent No.: US 7,731,084 B2
(45) Date of Patent: Jun. 8, 2010

(54) DEVICES AND METHODS FOR MONITORING TRANSACTION DATA FROM POINT-OF-SALE DEVICES

(75) Inventors: Fred Redick, Foster City, CA (US); Leonard Driver, Fullerton, CA (US)

(73) Assignee: Seiko Epson Corporation, Tokyo (JP)

( * ) Notice: Subject to any disclaimer, the term of this patent is extended or adjusted under 35 U.S.C. 154(b) by 786 days.

(21) Appl. No.: 11/135,224

(22) Filed: May 23, 2005

(65) Prior Publication Data

US 2006/0261159 A1 Nov. 23, 2006

(51) Int. Cl.
G06Q 40/00 (2006.01)
G07D 11/00 (2006.01)
G07F 19/00 (2006.01)
G06K 15/00 (2006.01)

(52) U.S. Cl. .................. 235/379; 235/381; 235/383; 705/16; 705/24; 705/39; 705/40; 705/41; 705/42; 705/43

(58) Field of Classification Search .................. 235/375, 235/379, 383, 381; 705/16, 24, 39–43
See application file for complete search history.

(56) References Cited

U.S. PATENT DOCUMENTS

| | | | |
|---|---|---|---|
| 4,723,212 A | 2/1988 | Mindrum et al. | |
| 4,910,672 A | 3/1990 | Off et al. | |
| 5,173,851 A | 12/1992 | Off et al. | |
| 5,233,547 A | 8/1993 | Kapp et al. | |
| 5,237,159 A | 8/1993 | Stephens et al. | |
| 5,412,190 A | 5/1995 | Josephson et al. | |
| 5,532,464 A | 7/1996 | Josephson et al. | |
| 5,612,868 A | 3/1997 | Off et al. | |
| 5,677,955 A | 10/1997 | Doggett et al. | |
| 5,691,524 A | 11/1997 | Josephson | |
| 5,783,808 A | 7/1998 | Josephson | |
| 5,802,156 A | 9/1998 | Felger | |
| 5,832,457 A | 11/1998 | O'Brien et al. | |
| 5,848,400 A | 12/1998 | Chang | |
| 5,884,288 A | 3/1999 | Chang et al. | |
| 5,892,827 A | 4/1999 | Beach et al. | |

(Continued)

OTHER PUBLICATIONS

Optical Channel Performance Monitors, BaySpec Enlightening Fiber Optic Networks, BaySpec, Inc. Feb. 20, 2002.

(Continued)

*Primary Examiner*—Thien M. Le
*Assistant Examiner*—Tuyen K Vo
(74) *Attorney, Agent, or Firm*—Workman Nydegger (57) ABSTRACT

Systems and methods for monitoring transaction data in a point-of-sale (POS) system. An inline component is connected between a POS terminal and a printer. The inline component monitors communications between the POS terminal and the printer as well as communications sent to or from other devices connected with the POS terminal. As the data in the communications are monitored, portions of the data are extracted and sent to a remote processing server. The remote processing returns information which could comprise a variety of information, such as: fraud deterrent data, store promotions, customer messages, and the like to the inline component. The inline component sends this information to the printer for presentation to the user. The information is typically sent to the printer without interfering with the transaction being performed by the POS terminal. Commands included in the information can be implemented by the inline component.

42 Claims, 4 Drawing Sheets

U.S. PATENT DOCUMENTS

| | | | |
|---|---|---|---|
| 5,915,007 A | 6/1999 | Klapka | |
| 5,926,795 A | 7/1999 | Williams | |
| 5,930,778 A | 7/1999 | Geer | |
| 5,936,219 A | 8/1999 | Yoshida et al. | |
| 5,974,399 A | 10/1999 | Giuliani et al. | |
| 6,021,202 A | 2/2000 | Anderson et al. | |
| 6,026,370 A | 2/2000 | Jermyn | |
| 6,029,150 A | 2/2000 | Kravitz | |
| 6,029,887 A | 2/2000 | Furuhashi et al. | |
| 6,038,548 A | 3/2000 | Kamil | |
| 6,067,524 A | 5/2000 | Byerly et al. | |
| 6,076,075 A | 6/2000 | Teicher | |
| 6,092,053 A | 7/2000 | Boesch et al. | |
| 6,098,053 A | 8/2000 | Slater | |
| 6,129,272 A | 10/2000 | Yoshida et al. | |
| 6,138,107 A | 10/2000 | Elgamal | |
| 6,164,528 A | 12/2000 | Hills et al. | |
| 6,181,837 B1 | 1/2001 | Cahill et al. | |
| 6,240,394 B1 | 5/2001 | Uecker et al. | |
| 6,278,979 B1 | 8/2001 | Williams | |
| 6,282,516 B1 | 8/2001 | Giuliani | |
| 6,283,366 B1 | 9/2001 | Hills et al. | |
| 6,301,379 B1 | 10/2001 | Thompson et al. | |
| 6,304,849 B1 | 10/2001 | Uecker et al. | |
| 6,307,958 B1 | 10/2001 | Deaton et al. | |
| 6,321,210 B1 | 11/2001 | O'Brien et al. | |
| 6,334,108 B1 | 12/2001 | Deaton et al. | |
| 6,351,735 B1 | 2/2002 | Deaton et al. | |
| 6,354,491 B2 | 3/2002 | Nichols et al. | |
| 6,363,365 B1 | 3/2002 | Kou | |
| 6,377,935 B1 | 4/2002 | Deaton et al. | |
| 6,390,362 B1 | 5/2002 | Martin | |
| 6,411,942 B1 | 6/2002 | Fujimoto | |
| 6,415,341 B1 * | 7/2002 | Fry et al. | 710/62 |
| 6,424,949 B1 | 7/2002 | Deaton et al. | |
| 6,484,146 B2 | 11/2002 | Day et al. | |
| 6,493,685 B1 | 12/2002 | Ensel et al. | |
| 6,505,171 B1 | 1/2003 | Cohen et al. | |
| 6,547,132 B1 | 4/2003 | Templeton et al. | |
| 6,574,377 B1 | 6/2003 | Cahill et al. | |
| 6,584,448 B1 | 6/2003 | Laor | |
| 6,600,823 B1 | 7/2003 | Hayosh | |
| 6,644,546 B2 | 11/2003 | George et al. | |
| 6,647,136 B2 | 11/2003 | Jones et al. | |
| 6,647,376 B1 | 11/2003 | Farrar et al. | |
| 6,684,195 B1 | 1/2004 | Deaton et al. | |
| 6,754,640 B2 | 6/2004 | Bozeman | |
| 6,795,809 B2 | 9/2004 | O'Brien et al. | |
| 6,827,260 B2 | 12/2004 | Stoutenburg et al. | |
| 6,885,994 B1 | 4/2005 | Scroggie et al. | |
| 6,886,742 B2 | 5/2005 | Stoutenburg et al. | |
| 7,232,063 B2 * | 6/2007 | Fandel et al. | 235/383 |
| 2001/0023407 A1 | 9/2001 | Liyanearachchi et al. | |
| 2002/0069115 A1 | 6/2002 | Fitzpatrick | |
| 2002/0077901 A1 | 6/2002 | Katz | |
| 2002/0091566 A1 | 7/2002 | Siegel | |
| 2002/0107728 A1 | 8/2002 | Bailey et al. | |
| 2002/0107729 A1 | 8/2002 | Katz | |
| 2002/0147639 A1 | 10/2002 | Williams et al. | |
| 2003/0028424 A1 | 2/2003 | Kampff et al. | |
| 2003/0088466 A1 | 5/2003 | Fitzpatrick | |
| 2003/0154163 A1 | 5/2003 | Phillips et al. | |
| 2003/0132294 A1 * | 7/2003 | Gomez et al. | 235/383 |
| 2004/0041022 A1 * | 3/2004 | Minowa et al. | 235/383 |
| 2004/0044575 A1 * | 3/2004 | Bakker et al. | 705/14 |
| 2005/0177427 A1 * | 8/2005 | Mount et al. | 705/14 |
| 2005/0211773 A1 * | 9/2005 | Nobutani | 235/383 |
| 2005/0242178 A1 * | 11/2005 | Minowa | 235/383 |
| 2005/0275894 A1 * | 12/2005 | Minowa | 358/1.18 |
| 2006/0091203 A1 * | 5/2006 | Bakker et al. | 235/381 |
| 2008/0133374 A1 * | 6/2008 | Nobutani | 705/24 |

OTHER PUBLICATIONS

US 6,862,578, 03/2005, Pollin (withdrawn)

* cited by examiner

DEVICES AND METHODS FOR MONITORING TRANSACTION DATA FROM POINT-OF-SALE DEVICES

CROSS-REFERENCE TO RELATED APPLICATIONS

Not applicable.

BACKGROUND OF THE INVENTION

1. The Field of the Invention

Embodiments of the invention relate to systems and methods for monitoring transaction data. More particularly, embodiments of the invention relate to systems and methods for filtering transaction data or inserting data, without interfering with the computer applications or transactions performed by the point-of-sale systems.

2. The Relevant Technology

Point-of-sale (POS) systems are widely used in the world today to perform various types of transactions including financial transactions. A typical POS system includes a POS terminal that is connected with a printer. The POS terminal is also connected with various devices, such as a card reader, that may be used to collect data from a user or customer. Once the data is collected (such as by swiping the card in the card reader), the applications including the payment system of the POS terminal attempt to authorize the transaction using the collected data. Once the transaction is authorized and completed, a printer is typically used to provide a receipt of the transaction to the user. Thus, the POS terminal is often used as a payment mechanism and one of the primary purposes of the POS terminal is to enable an entity to authorize credit, debit, and check transactions. Once authorized, the POS system can then finalize the transaction.

Often, a POS terminal is integrated with other systems. For example, the POS terminal may be connected to a local area network (LAN), a wide area network (WAN), and/or the Internet. Over the LAN, for instance, the POS terminal may have access to several databases that can be used in various stages of the transactions performed by the POS terminal. These databases may include a price look up (PLU) database, a transaction log database, management information, and the like. Some of the information in these databases may be accessed and used during the course of a particular transaction.

For example, the POS terminal may be connected to a bar code reader. After scanning the bar code from a product, the POS terminal may access the PLU database to determine the price associated with the scanned bar code. In this manner, the bar code reading application as well as other applications on the POS terminal can be used to facilitate the price look up operation as well as other aspects of the transaction including the financial aspects.

Because a POS terminal interacts with various devices, databases, networks, and other systems, upgrading the POS terminal or one of the devices or databases can present several difficulties. One of the primary concerns when upgrading a POS terminal is ensuring that compatibility remains between the POS terminal and the other devices, databases, etc., used in the POS system. Incompatibility can result in downtime that is costly in terms of both time and money.

As a result, upgrading a POS terminal or a printer in a POS system often requires substantial testing of the POS terminal in order to insure compatibility with other components of the POS system. Several question and answer sessions may be required, in fact, in order to fully implement the various changes included in the upgrade. In addition, there is the additional cost of training employees to use the new POS terminal and associated applications.

Further, some entities may be hesitant to upgrade their POS terminal in view of the fact that the applications operating on their POS terminal are no longer supported by the manufacturer. As a result, there is no guarantee that the upgrade can be successful without compromising existing data or without causing compatibility issues that are difficult to resolve.

BRIEF SUMMARY OF THE INVENTION

These and other limitations are overcome by embodiments of the present invention, which relate to systems and methods for monitoring transaction data in a POS system. Embodiments of the invention include an inline component that can provide the benefits of an upgrade without having to upgrade the POS terminal itself.

The inline component is an inline device installed in a computer environment such as a POS system. The inline component can monitor the communications occurring in the POS system (or other computer environment) and be able to extract and/or insert data into the communications occurring in the POS system. More specifically, the inline component monitors communications between a POS terminal and a printer as well as the communications sent to and from devices connected with the POS terminal.

Embodiments of the invention can control peripheral devices including the printer that would conventionally only be controlled by an application program resident on the POS terminal or on the primary computer. The inline device can filter the data on the POS system and send at least a portion of the data to an external server. The external server typically has a database that it can access in order to generate information that is related to the portion of the data provided by the inline device.

The inline device then receives this information from the remote server and inserts the information into the communications. For example, the inline device can establish control of the printer and cause the information received from the external server to be printed for the user. Often, the inline device does not take control of a peripheral device such as the printer until after a transaction performed by the POS system is completed. This ensures the integrity of the transaction. Advantageously, the inline device can be used to upgrade the capabilities of the POS system without upgrading the components of the POS system including the POS terminal. As a result, compatibility issues are eliminated. Also, other costs such as retraining employees and potential downtime are also eliminated because the inline device can control the peripheral devices and insert data into the communications in the POS system.

In one example, the inline component includes a receive/transmit module such as a DUART that transmits data from a POS terminal to a printer and from the printer to the POS terminal. The inline component also includes one or more processors that monitor and/or filter the data in the POS system including the data in the communications between the POS terminal and the printer. The inline component can extract portions of the data and then send that data to a remote server such as a processing server or service that uses the extracted data to generate information. The inline component facilitates the ability of a remote processing service to generate information that can be delivered or presented to a user.

The information may include, for example, store promotions for the user. The inline device then receives the information and sends or delivers the information to the printer where the information is presented or delivered to the user. Generally, the information presented or delivered to the user is done in a manner that does not interfere with the transaction being performed by the POS system. For example, the information is only sent after the inline component detects a specified string in the communication between the POS terminal and the printer or after the transaction is completed.

The inline component may also include ports that connect the inline component to the POS terminal and to the printer. The inline component also monitors the peripheral devices using I/O as well. In addition, a switch can connect the inline component to the local area network or to an external network. The extracted data is sent over the external network in one example.

In another embodiment of the invention, a method for monitoring transaction data for a point-of-sale (POS) system with an inline component may include monitoring the data communicated on a network link between a POS terminal and a printer. Then, the inline monitor extracts a portion of the data that is related to the transaction and is typically provided by a user. This portion of the data is then sent to a remote processing server that returns information to the inline device. The received information is then typically sent to the printer for delivery or presentation to the user. The information, for example, may include store promotions that are determined according to the information extracted from the communications occurring in the POS system.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for monitoring transaction data in computer environments. Embodiments of the invention are discussed in the context of point-of-sale (POS) systems, but one skilled in the art can appreciate that other computer networks and the data transmitted on those networks can also be monitored.

Embodiments of the invention include an inline component that can inspect and filter data in a POS system as the data flows between the POS terminal and other devices of the POS system including a printer. The inline component can be configured to extract data present in the communications of the POS system and then send the extracted data to a remote server for processing. The inline component then receives information from the remote server that is based on the extracted data. The inline component provides this information at the printer for delivery to a user without affecting the normal processes or transactions performed by the POS system.

The inline component is an electronic device installed in the POS system. The inline component both monitors and extracts data from peripheral devices of the POS system. The inline component also inserts data into peripheral devices of the POS system. The inline component can establish controls for those peripheral devices that normally would only be controlled by the application program resident in the POS terminal. The inline component can also establish a communication channel between an external server in the world-wide-web and this normally-closed POS system.

One purpose of the inline component is to facilitate the movement of "data" generated or used by the peripheral-devices and normally only available and usable between that POS terminal and these peripheral devices. The data-monitoring-and-interpretation capability of the computer program resident on the inline component, in conjunction with the communication channel of the inline component, enables the inline component to make the normally inaccessible peripheral data available to a remote server on the world-wide-web for application use. Similarly, the inline component can receive information including "data" and commands from the server on the world-wide-web and insert that information into the peripheral devices interconnected to the POS terminal. In some embodiments, the inline component can control one or more of the other devices in the POS system. For example, the inline component may control the printer in the POS system in order to present the information received from the remote server to a user or customer.

The inline component can view the internal network of a POS system and view the data that exists on that internal network. The inline component can monitor the data in multiple ways. The data can be filtered, copied, sorted, and the like to identify data that can be used by an external server or service. The inline component can also add data to the network without adversely affecting the transactions performed by the POS system.

Figure 1:
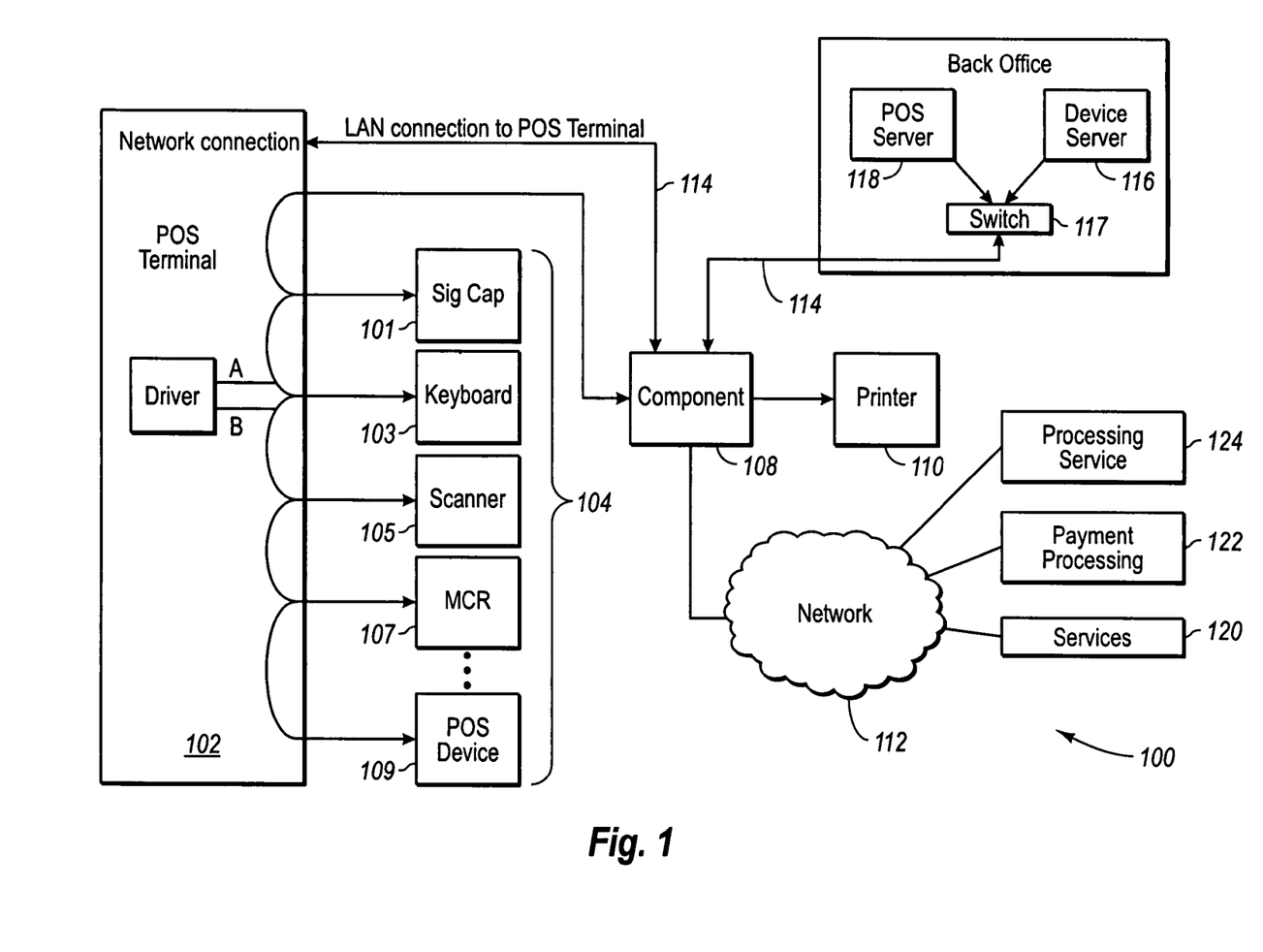
FIG. 1 illustrates an exemplary environment for implementing embodiments of the invention.

FIG. 1 illustrates an exemplary environment for implementing embodiments of the invention. In FIG. 1, the POS system 100 includes a POS terminal 102. The POS terminal 102 enables the POS system 100 to perform transactions that include processing financial cards such as credit and debit cards, recording and tracking customer orders, managing inventory, conducting price look up operations, accessing a database, printing receipts for customers and for recordkeeping, and the like or any combination thereof In this example, the POS terminal 102 has access to a POS server 118 and a device server 116 through a LAN 114. The POS server 118 and the device server 116 may be connected with a switch 117. The POS server 118 and/or the device server 116 can include price look up services, transaction logs, management data, and the like. Payment processing 122, may alternatively be accessed through the LAN 114. Other services 120 may include, by way of example, telecom services, fraud screening, and the like. The POS terminal 102 may also have access to payment processing 122 and other services 120 through a network 112 such as the Internet. The network 112 may be accessed by the devices and components in the POS system 100 through a switch or hub, for example. The components 108, for instance, may include a switch.

The POS terminal 102 is connected with one or more POS devices that are represented generally by the POS devices 104. POS devices may include, but are not limited to, a sig cap 101, a keyboard 103, a scanner 105, an MCR 107 and POS device 109. Other POS devices may include, but are not limited to, a card terminal, a card reader, a bar code reader, wireless devices, legacy terminals, and the like. Each of the POS devices 104 can typically generate data or receive data. A card reader, for example, collects user data from credit cards, debit cards, frequent use cards, and the like. The data obtained from a credit card, for instance, may be used to authorize payment. In another example, a scanner can image a check, for example. The check image can be stored in a database or used in place of the paper check for clearing purposes.

The POS terminal 102 is also connected with a printer 110. The printer 110 can be integrated with one of the POS devices 104. For example, the printer 110 may also include a scanner in addition to printing capabilities. The printer 110 is often used to print a report (such as a receipt) of a transaction processed by the POS terminal 102.

The inline component 108 is placed inline between the POS terminal 102 and the printer 110. The component 108 views data on the link to and from the POS terminal 102. The component 108 is typically placed such that it is able to view or inspect data that may originate at the POS devices 104 as well. FIG. 1 illustrates, for example, that communication to or from the POS devices 104 can be viewed or monitored by the component 108. Although FIG. 1 illustrates that the POS devices connect with the component 108 through the POS terminal 102, the POS devices 104 could also be directly coupled with the component 108.

In fact, the component 108 is typically placed in the system 100 such that all of the connections to and from the POS terminal 102 can be monitored. FIG. 1 illustrates that all data from the POS devices pass through the component 108. The POS terminal 102 also accesses remote servers or services (payment processing 122, services 10, POS server 118, and device server 116) through the component 108.

In some instances, the POS terminal 102 may include connections that are not monitored by the component 108. A POS terminal 102, for example, may have a separate connection with payment processing 122. However, even though the POS terminal 102 may have a separate connection to a server or service such as payment processing 122, the component 108 may still have access to the information that is included in the communication with the payment processing 122. The component 108 may also have access to a processing service 124 that is accessible by the POS terminal 102.

In operation, a transaction at the POS terminal 102 may involve one of the POS devices 104 and/or the printer 110. Any data collected during the transaction (such as typed into a keyboard, scanned in with a scanner, read from a card swipe, etc.) is viewed or monitored by the component 108. As described in more detail below, the component 108 can extract some of this data and then send the extracted data securely to the processing service 124. In some embodiments, the processing service 124, which is one example of a remote server, and the payment processing 122 are the same thing and may correspond to the same entity. The processing service 124 can analyze the data in any manner and return information to the component 108. The component 108 can then communicate the information received from the processing service 124 to one of the devices in the POS system 100 such as the printer 110. Advantageously, the component 108 does not interfere with the transaction performed by the POS terminal 102.

Figure 2:
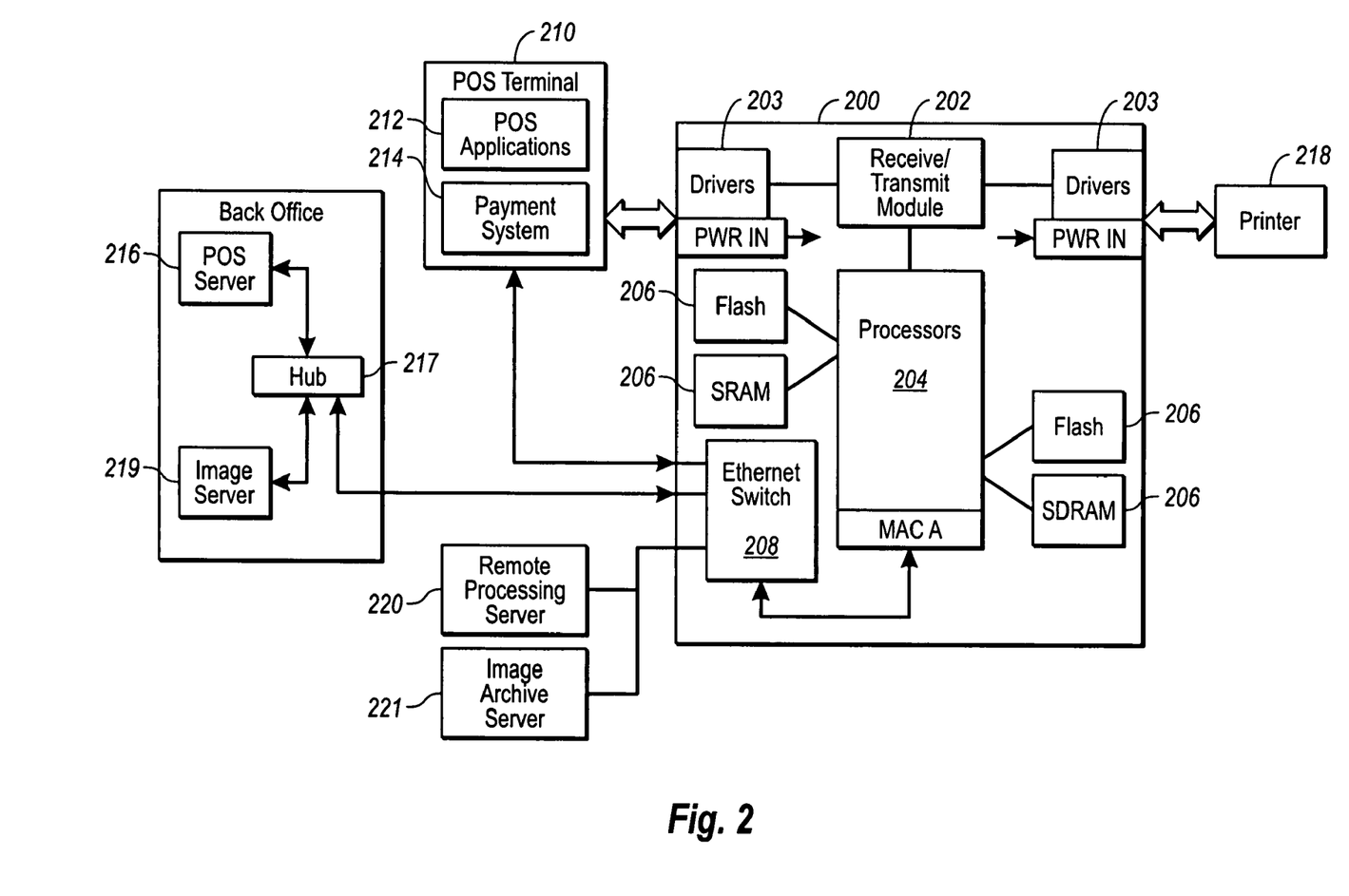
FIG. 2 illustrates an exemplary inline component connected between a POS terminal and a printer.

FIG. 2 illustrates a more detailed block diagram of a component 200, which is one example of the component 108 shown in FIG. 1. The component 200 is placed inline between the POS terminal 210 and the printer 218. The POS terminal 210 includes POS applications 212 and a payment system 214. Communications from the POS terminal 210 to the POS server 216 and to the image server 219 are routed through a switch 208 in the component 200. The switch 208 may also be used by the inline component 200 to communicate with the remote processing server 220. The communications to the POS terminal 210 may occur, for example, using a LAN, while the communications from the component 108 to the remote processing server 220 may occur over another network such as the Internet. In one embodiment, the component 200 can communicate with the remote processing server 220 independently of the other portions of the POS system 201. This ability to act independently enables the component 200 to enhance the performance of the POS system 201 and enable a service such as the remote processing server 220 to add services and functionality to the POS system 201.

A copy of the data or of a portion of the data in the communications between the POS terminal 210 and the POS server 216 is provided to the processors 204 and can be examined by the component 200. Memory 206 is included in the component 200 and can be used by the processors 204. In one embodiment, the component 200 sends a copy of the extracted data to a remote processing server 220. The remote processing server 220 evaluates the data and returns information that can be sent to the printer under the control of the inline component 200. In one example, this information includes store promotions that are selected based on the data originally sent to the remote processing server 220.

For example, when a user uses a credit card to pay for merchandise, the card is read by a card reading device. The device is able to obtain the credit card number, the name on the credit card, the expiration date, frequent purchasing or use information, and other information that may be included on the card. As the POS system processes the credit card information, the component 200 can detect this information and send a copy to the remote processing server 220. The remote processing server 220 can then select store promotions for the user of the credit card based on the information. The remote processing server 220, for example, may have a database that includes information relating to the credit card of the user. Other applications can be applied to the data by the remote processing server 220 as well.

The remote processing server 220 then sends information back to the component 200 that is based on the credit card information. The component 200 delivers this information to the printer 218. As a result, the user of the credit card can receive targeted store promotions in addition, for example, to their receipt. The advantage of the component 200 is that any changes to applications at the remote processing server 220 do not affect the component 200. The component monitors information in the POS system, sends certain data to the remote processing server 220 (or other location) and then receives back store promotion data or other information that can be presented to the user using the printer 218 or other device. This ameliorates or eliminates the need to upgrade the POS terminal 210.

Communications between the POS terminal 210 and the printer 218 pass through the component 200. In this example, the communications pass through a receive/transmit module 202. The receive/transmit module 202 may connect with the POS terminal 210 and the printer 218 using, by way of example and not limitation, a 485 protocol as illustrated by the 485 drivers 203. One skilled in the art can appreciate the use of other busses and protocols. Using the processors 204, the component 200 is able to monitor the data included in the communications passing through the component 200. Thus, the POS terminal 210 and the printer 218 are not necessarily aware of the presence of the inline component 200. The receive/transmit module 202 can be a passive pass through device. Alternatively, the receive/transmit module 202 can be more active and store the data in a queue, for example, before retransmitting the same data. In either case, the component 200 has the ability to view and extract data or to copy the data that is present in the POS system. By copying or otherwise extracting the data while still passing the data through the inline component 200, the transaction performed by the POS system is not interrupted and the component 200 does not interfere with the transactions performed by the POS system.

This can be achieved, in one example using an emulation module that may include software and/or hardware that can emulate the printer 218 and/or the POS terminal 210. The POS terminal 210 functions normally while the component 200 is able to add value to the information or data in the POS system. In effect, the component 220 is an inline component that provides pass-through, command inspection, and data filtering between a POS terminal and a printer. The filtered data can be configured for a specific application and sent out using an Ethernet connection (or other suitable connection) to a remote host server.

In one embodiment, the component 200 can be used to eliminate the need to upgrade or revise the POS terminal 210, the POS applications 212, the payment system 214 or the POS system itself. As previously indicated, upgrading or revising the POS application can be costly in terms of debugging, question and answer sessions, employee training, and the like. The component 200 enables the existing POS system to be used while still providing the benefit of applications that may be implemented by the remote processing server 220. The component 200 can also be upgraded remotely over the remote processing server 220 when necessary.

FIG. 2 also illustrates that the POS system 201 includes an image server 219. The component 200, however, can also identify when a check image is included in data communicated in the POS system 201. The component 200 can extract the check image and transfer the check image to a remote image archive server 221. The image archive server 221 maintains an image database. The POS system 201 can use the services of the image archive server 221 to process check images according to applicable regulations (federal check 21 initiative).

Figure 3:
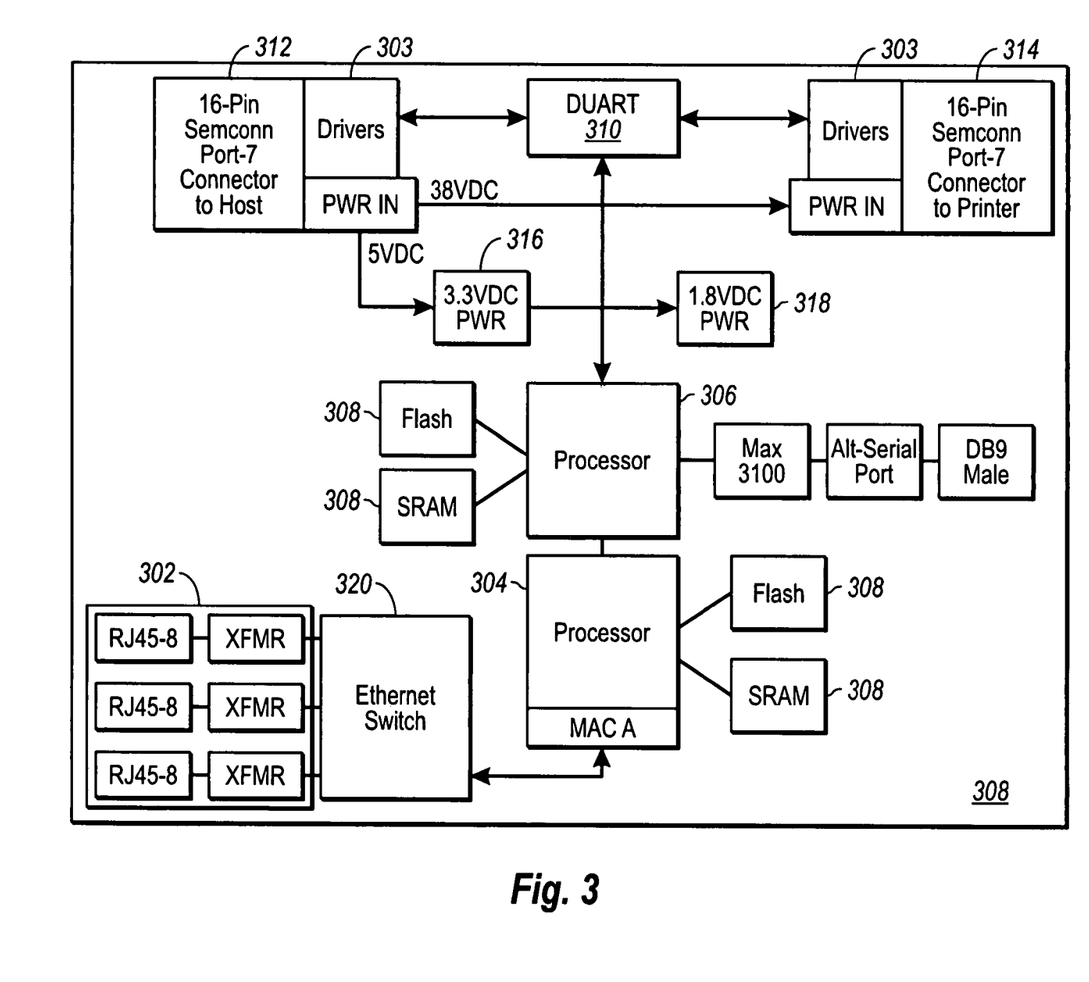
FIG. 3 illustrates another embodiment of the inline component for monitoring transaction data in a network such as a POS system.

FIG. 3 illustrates a more detailed view of a component 300, which is another example of the component 108 in FIG. 1. The component 300 connects with a printer through the port 314 and with a POS terminal through the port 312. A DUART (Dual Universal Asynchronous Receiver/Transmitter) 310 is connected between the port 314 and the port 312. The DUART 310 is one example of a receive/transmit module. The DUART 310 receives from a POS terminal thorough the port 312 and then transmits the same data to a printer through the port 314 and vice versa. The component 300 also uses drivers 303 in this example, which may use a 485 protocol.

The processor 306, which is an Atmel 8051 processor available from Atmel Corporation in one embodiment, provides the monitoring and filtering of the data passing between the printer and the POS terminal or other host. The processor 306 may also provide any needed emulation. The processor 306 can extract or copy the data that is being communicated between the host and the printer or that are associated with any peripheral devices or external servers. In other words, the component 300 has access to all of the I/O ports associated with the POS system or the POS terminal. The processor 306 can look for certain data that, when found, can be extracted or copied. The extracted or copied data can then be sent to an external server or service such as the remote processing server 220 in FIG. 2.

The processor 304, which is an Atmel AT91 ARM Thumb available from Atmel Corporation in one embodiment, provides for networking communications pass-through to the host and filtered data communications. In one embodiment, the processor 304 interfaces with an Ethernet switch 320. The Ethernet ports 302 can communicate with the processor 304 through the switch 320. In one embodiment, one of the Ethernet ports 302 connects with an existing LAN associated with the POS terminal, one of the ports 302 connects with the POS terminal, and another of the ports 302 can connect with another peripheral device, computer, and the like or with the LAN. The ports 302 are not typically protocol dependent and will pass all data to the intended destination.

The component 300 may also include an internal web server for configuring the component 300 that can only be accessed, in one embodiment, using a secure protocol. Some of the parameters that can be configured include the IP address of the inline component, the subnet mask of the inline component, the default gateway of the inline component, the IP address of the remote processing service, the peripherals to be monitored or analyzed in the POS system, the enablement or disablement of discovery protocols used to identify peripheral devices in the POS system, usernames/passwords, and the like or any combination thereof.

When the component 300 receives information from the remote processing server to be printed, the information is only sent, in one example, to the printer once a certain string is detected in the communication between the POS terminal and the printer. This ensures that the information received from the remote processing server does not interfere with the transaction performed by the POS system.

In one embodiment, the memory 308 of the component 300 and the processors 304, 306 can include the intelligence needed to emulate either a printer or a host or a POS terminal. For example, the component 300 may appear as a printer to the host or POS terminal connected to the port 312. Most response packets sent to the POS terminal or to the host originate from the printer connected with the port 314. Certain response packets (e.g. Request On Line, Non-Sequence Acknowledge, Receiver Ready, End of Poll) may alternatively generated by the component 300. In both cases, data tracking and data integrity are insured. The component 300 may also appear as a host or a POS terminal to an attached printer. All data received from the host is sent to the printer plus any side input data injected by the component 300.

The component 300, as previously described can monitor several peripheral devices that may be connected to the POS terminal. Data sent to and from these peripheral devices are typically associated with an address. As a result, these addresses can be monitored and the corresponding data associated with those addresses can be extracted or copied by the component 300.

Figure 4:
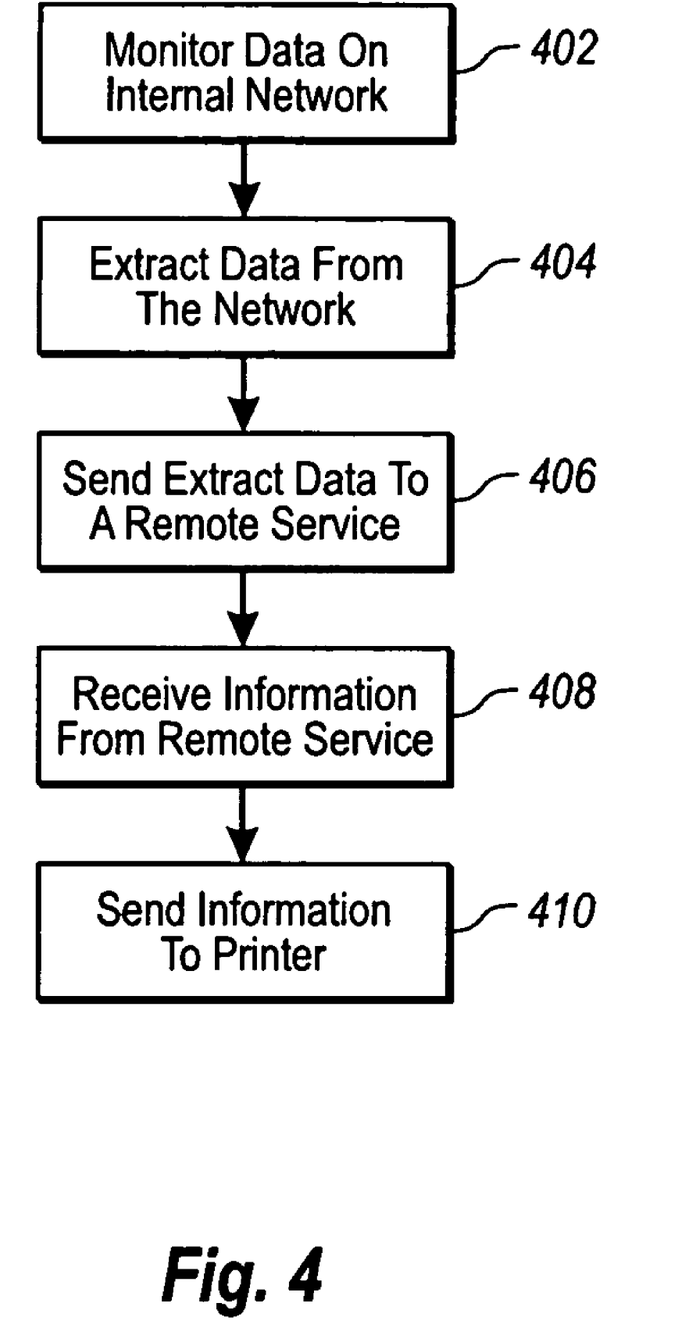
FIG. 4 is a flow diagram for monitoring transaction data in a computer network such as a POS network.

FIG. 4 illustrates an exemplary method for monitoring transaction data in a POS system. After an inline component is added to a POS system, the inline component can monitor data 402 on the internal network of the POS system. Monitoring the data may include, by way of example, filtering the data or snooping the data until certain data or data patterns are detected. Monitoring the data on the network can also include monitoring information that is sent and received from the POS system to external systems.

Next, a portion of the data is extracted 404 from the network. For example, certain transactions conducted on a POS system include swiping a financial card, scanning a check, or other user input. The inline component monitors the network data at for these transactions and then extracts or copies the data. The extracted or copied information is then sent 406 to a remote service. The extracted data can be determined by code stored in the memory 308. For example, the component 300 may only extract the name of the person on a credit card and a frequent use number, while ignoring the credit card number itself. Thus, the component 308 can be programmed to extract certain data and ignore other data. The component 308 can also be upgraded, thereby enabling additional data to be monitored and extracted.

The remote service that receives the extracted data may maintain a large database of user information. The extracted data can be used by the remote service to track and trigger off of data, device commands, or other types of information. This information (which can include store promotions, device commands, status of electronic check images, etc.), in one example, is received 408 by the inline component. After the transaction conducted by the POS system reaches a certain point (printing the receipt, for example), the inline component can send 410 the information received from the remote service to the printer. The information, as previously stated, may also include commands that are executed under the control of the inline component.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussions are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inline component for monitoring transaction data in a point-of-sale (POS) system, the inline component comprising:
    a first port that connects with a POS terminal;
    a second port that connects with a printer;
    a receive/transmit module that passes communications that are to the POS terminal and the printer between the first port and the second port;
    at least one processor that monitors the communications between the first port and the second port at the receive/transmit module and which is configured to send and receive communications with a remote processing server and a POS server without reconnecting to the POS terminal, wherein the at least one processor extracts data from the communications, the data being used by a remote processing server to generate information that is delivered to a user through the second port to the printer; and
    a switch connected to the at least one processor that communicates with the POS server and the remote processing server.

2. An inline component as defined in claim 1, wherein the receive/transmit module passes communications including data from (i) the POS terminal to the printer and (ii) the printer to the POS terminal.

3. An inline component as defined in claim 2, wherein the at least one processor further comprises:
    a first processor that monitors and filters the communications including data passed by the receive/transmit module; and
    a second processor that provides networking communications.

4. An inline component as defined in claim 3, wherein the networking communications include a plurality of Ethernet connections.

5. An inline component as defined in claim 1, wherein the at least one processor monitors communications sent to or received from one or more devices attached to the POS terminal.

6. An inline component as defined in claim 5, wherein the one or more devices include at least one of:
- a keyboard;
- a card reading device;
- a scanner; and
- a bar code reader.

7. An inline component as defined in claim 1, wherein the receive/transmit module further comprises a Dual Universal Asynchronous Receiver/Transmitter.

8. An inline component as defined in claim 1, further comprising an emulation module such that the inline component appears as (i) the printer to the POS terminal and as (ii) the POS terminal to the printer.

9. An inline component as defined in claim 1, wherein the at least one processor sends the information received from the remote processing server to the printer such that the information does not interfere with a transaction performed by the POS terminal and the printer.

10. An inline component for monitoring transaction data in a point-of-sale system, the inline component comprising:
- a receive/transmit module that transmits data from a POS terminal to a printer and from the printer to the POS terminal;
- a first processor that filters the data transmitted by the receive/transmit module, wherein the first processor extracts a portion of the data;
- a second processor in communication with the first processor, the second processor providing network communications; and
- a switch that connects the second processor directly with an external network and a POS server, wherein the second processor sends the portion of the data to a remote processing server over the external network or to the POS server over an internal network and receives information from the remote processing server and the POS server that is sent to the printer for presentation to a user.

11. An inline component as defined in claim 10, further comprising:
- a first port connected with the receive/transmit module, wherein the first port provides an interface to the POS terminal; and
- a second port connected with the receive/transmit module, wherein the second port provides an interface to the printer.

12. An inline component as defined in claim 11, further comprising an emulation module enabling the system to (i) appear as the printer to the POS terminal and to (ii) appear as the POS terminal to the printer.

13. An inline component as defined in claim 10, further comprising memory connected with the first processor and second memory connected with the second processor.

14. An inline component as defined in claim 10, further comprising an internal web server used to configure the inline component, wherein the internal web server is accessible over a secure protocol.

15. An inline component as defined in claim 14, wherein the inline component further comprises configurable parameters including one or more of:
- an IP address;
- a subnet mask;
- a default gateway;
- an IP address of the remote processing server;
- peripheral devices connected with the POS terminal;
- discovery protocol; and
- usernames and passwords.

16. An inline component as defined in claim 10, wherein the information received from the remote processing server is sent to the printer after the first processor detects a specified data string such that the information does not interfere with a transaction performed by the POS terminal.

17. An inline component as defined in claim 10, wherein the information received from the remote processing server further comprises trigger information based on the portion of the data extracted from the data transmitted by the receive/transmit module.

18. An inline component as defined in claim 10, wherein at least one of the first processor and the second processor filters additional data sent to or from one or more devices connected to the POS terminal.

19. An inline component as defined in claim 10, wherein the external network is at least one of a LAN and the Internet.

20. An inline component as defined in claim 10, wherein the second processor sends a second portion of the data to the POS server and receives information from the POS server.

21. A method for monitoring transaction data for a point-of-sale (POS) system with an inline component, the method comprising:
- monitoring data communicated on a network link between a POS terminal and a printer;
- extracting a portion of the data, wherein the portion of the data includes information provided to the POS terminal by a user;
- sending the portion of the data to a remote processing server via a switch which communicates directly with a POS server and the remote processing server, without reconnecting to the POS terminal;
- sending a second portion of the data to a POS server directly connected with the inline component via the switch;
- receiving information from the remote processing server via the switch, wherein the information is related to the portion of the data sent to the remote processing server;
- receiving additional information from the POS server via the switch, wherein the additional information is related to the second portion of the data sent to the POS server; and
- sending the information from the remote server and the additional information from the POS server to the printer for delivery to the user.

22. A method as defined in claim 21, wherein monitoring data communicated on a network link between a POS terminal and a printer further comprises monitoring additional data sent to and from one or more devices connected with the POS terminal.

23. A method as defined in claim 21, wherein monitoring data communicated on a network link between a POS terminal and a printer further comprises filtering the data to identify a portion of the data related to a transaction performed on the POS terminal by a user.

24. A method as defined in claim 21, wherein extracting a portion of the data further comprises copying the portion of the data.

25. A method as defined in claim 21, wherein sending the portion of the data to a remote processing server further comprises connecting to one of a LAN or the Internet.

26. A method as defined in claim 21, wherein sending the information to the printer for delivery to the user further comprises sending the information to the printer after detecting a specified data string in the data sent to the printer by the POS terminal.

27. A method as defined in claim 21, further comprising sending the information to the printer for delivery to the user without interfering with a transaction performed by the POS terminal.

28. A method as defined in claim 21, further comprising receiving configuration data from the remote server over a secure connection, the configuration data including one or more of:
- an IP address of the inline component;
- a subnet mask of the inline component;
- an IP address of the remote processing server;
- devices to be monitored that are connected to the POS terminal;
- enabling or disabling discovery protocol; and
- usernames and passwords.

29. A method as defined in claim 21, further comprising updating firmware of the inline component over a secure connection.

30. A method as defined in claim 21, wherein monitoring data communicated on a network link further comprises:
- monitoring a protocol of the POS terminal; and
- monitoring a protocol of devices connected with the POS terminal; and
- monitoring a protocol of an external network.

31. A method as defined in claim 21, further comprising storing an image of a check in an image repository.

32. An inline component for monitoring communications in a point-of-sale (POS) system, the inline component comprising:
- a connection with a POS terminal;
- a connection with a printer;
- a switch which communicates with a POS server and a remote processing server; and
- at least one processor configured to communicate with the POS terminal and the printer, and directly monitor the communications with the POS server and the remote processing server via a connection to the switch without reconnecting to the POS terminal, wherein the at least one processor extracts data from the communications in order to generate information delivered through the connection to the printer.

33. An inline component as defined in claim 32, wherein the connection with the POS terminal and the connection with the printer comprises a receive/transit module configured to pass the communications including data from (i) the POS terminal to the printer and (ii) the printer to the POS terminal.

34. An inline component as defined in claim 32, wherein the at least one processor further comprises:
- a first processor configured to monitor and filter the communications between the POS terminal and the printer; and
- a second processor that is configured to monitor and filter the communications to the POS server.

35. An inline component as defined in claim 32, wherein the inline component further comprises a plurality of network connections and the processor is further configured to communicate with a remote server via at least one of the plurality of network connections in order to obtain information from the remote server that may be delivered to the user.

36. An inline component as defined in claim 32, wherein the at least one processor is configured to monitor communications sent to or received from one or more devices attached to the POS terminal.

37. An inline component as defined in claim 36, wherein the one or more devices include at least one of:
- a keyboard;
- a card reading device;
- a scanner; and
- a bar code reader.

38. A point-of-sale (POS) system comprising:
- a POS terminal connected to one or more devices;
- a printer; and
- an inline component connected to the POS terminal and the printer, the inline component configured to send and receive communications with the POS terminal and the printer using a switch which communicates directly with each of the POS terminal, a POS server, and a remote processing server, the inline component comprising one or more processors which are configured to monitor the communications with the POS terminal, POS server, remote processing server, and the printer, wherein the at least one processor extracts data from the communications in order to generate information for delivery through the connection to the printer;
- wherein the POS terminal is configured to communicate directly with the one or more devices without reconnecting to the at least one processor.

39. The POS system as defined in claim 38, wherein the inline component is configured to send and receive communications with the POS terminal and the printer connection with a receive/transmit module.

40. The POS system as defined in claim 39 wherein the receive/transit module is configured to pass communications including data from (i) the POS terminal to the printer and (ii) the printer to the POS terminal.

41. The POS system as defined in claim 38, wherein the at least one processor further comprises:
- a first processor that configured to monitor and filter the communications with the POS terminal and the printer; and
- a second processor that is configured to monitor and filter the communications to the POS server.

42. The POS system as defined in claim 38, wherein the inline component further comprises a plurality of network connections and the at least one processor is also configured to communicate with a remote server via a network connection in order to obtain information from the remote server that may be delivered to the user.

* * * * *